Figure 1:
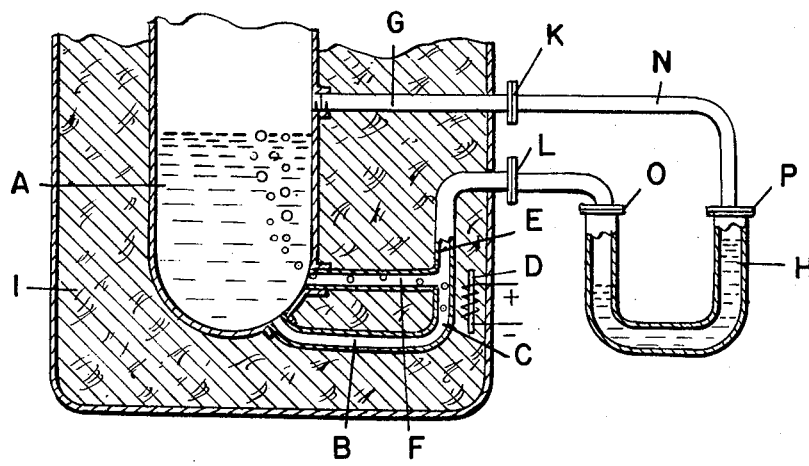

Inventor
JULES VOLEAU,
By Stone, Boyden & Mack
ATTORNEYS

Feb. 20, 1951  J. VOLEAU  2,542,168
LIQUID LEVEL INDICATOR
Filed Aug. 10, 1945  2 Sheets-Sheet 2

Inventor
JULES VOLEAU,
By Stone, Boyden & Mack
ATTORNEYS

Patented Feb. 20, 1951

2,542,168

UNITED STATES PATENT OFFICE 2,542,168

LIQUID LEVEL INDICATOR

Jules Voleau, Boulogne-sur-Seine, France, assignor to L'Air Liquide, Societe Anonyme pour l'Etude et l'Exploitation des Procedes Georges Claude, Paris, France Application August 10, 1945, Serial No. 610,078
In France August 10, 1943

5 Claims. (Cl. 73—302)

It is known that level indicators for receptacles containing liquefied gases that are liquid at temperatures lower than the surrounding temperature, are essentially constituted by an outgoing pipe branch followed by an ascending branch in which the liquid is vaporized by any kind of heating means and which leads to a liquid pressure gauge, for example to one of the branches of a U tube, the other branch of which is in communication with the gaseous atmosphere above the liquid in question; the vaporization of the liquid produces a gaseous pressure which is transmitted to the pressure gauge and the value of which corresponds to the height of liquid to be measured. In practice, the liquefield gases are not in an absolutely pure state; some of them, such as ethylene or propane, extracted from coke oven gases or from petroleum refining gases, contain, as impurities, products boiling at a higher temperature, such as benzol, heavy hydrocarbons, which vaporize with difficulty in the branch of the level indicator; they therefore accumulate in said branch, and their failure to vaporize as well as slight leakages that may exist in this pressure gauge, prevent the indication of the said pressure gauge from following the variations of the level of the liquid in the receptacle; the indications of the pressure gauge are thus rendered inaccurate and its working is even completely stopped if the heavy products are deposited in the solid state in the vaporization branch.

It is possible to partially obviate these drawbacks by periodically drawing off the liquid accumulated at the bottom of the level indicator; however this mode of procedure not only involves a loss of cold liquid, but is unsatisfactory especially in the case where the receptacle forms part of an apparatus for the liquefaction of gases and where the correct operation of the level indicator is indispensable for the satisfactory working of this apparatus, for example, for the maintenance of the quantity of liquid in which a device for vaporizing the liquid is immersed.

The present invention completely obviates these drawbacks. It consists in arranging on the indicator described above an additional branch returning to the liquid in the receptacle the vaporized gas carrying along liquid. This additional branch connects the receptacle with a place of the piping consisting of the above mentioned outgoing pipe branch and ascending vaporisation branch. At this place the vaporisation may have or on the contrary may have not yet taken place. In the first case, there is established in the outgoing pipe branch for the liquid, then in the vaporization branch and finally in said additional branch, a continuous circulation of the liquid coming from the receptacle, with presence of gas bubbles in the last two branches. In the second case, the circulation of the mixture of liquid and bubbles only takes place in the outgoing pipe branch and in the additional branch. In both cases, by suitably dimensioning the branching pipes and producing a suitable amount of heat for the partial vaporization of the liquid, a sufficient amount of liquid is vaporized in order to obtain the maximum circulation, thus avoiding all undesirable accumulation of the products of lesser volatility or likely to solidify.

The accompanying drawing shows diagrammatically, by way of example, four forms of embodiment of the present invention.

Figure 2:
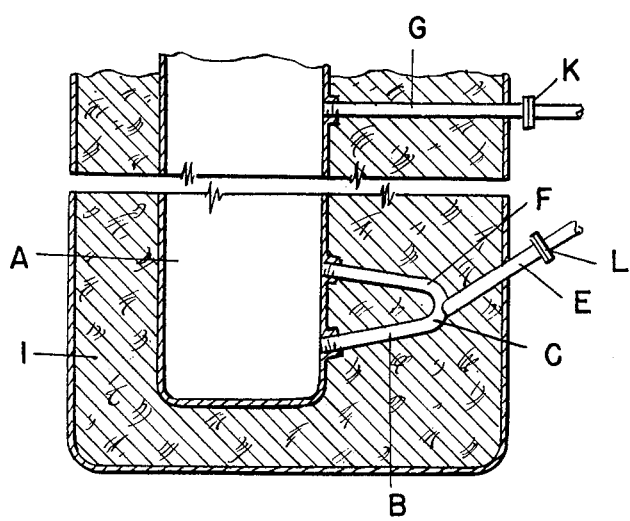
Figure 5:
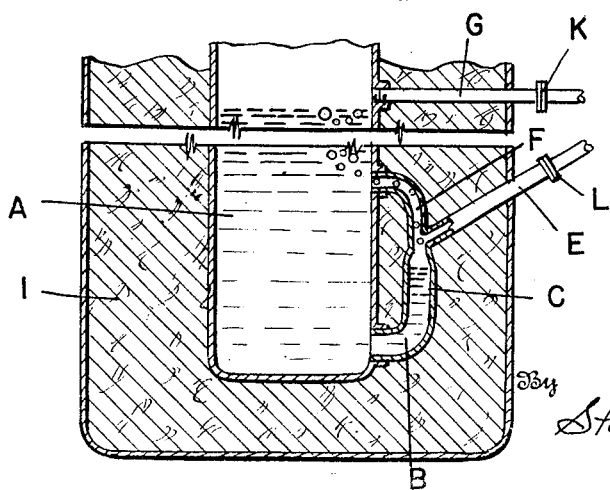
Figure 6:
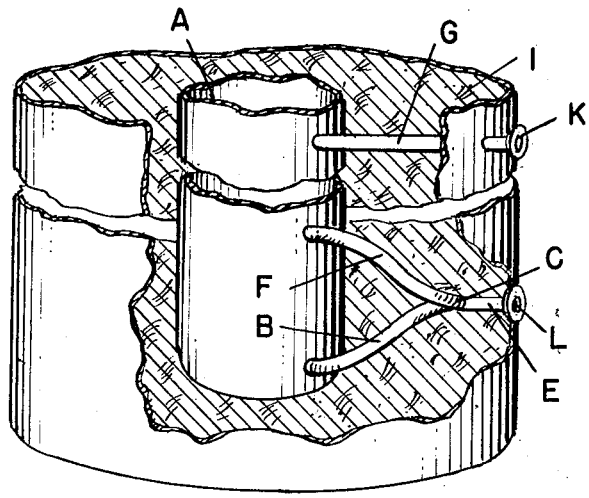
Figure 3:
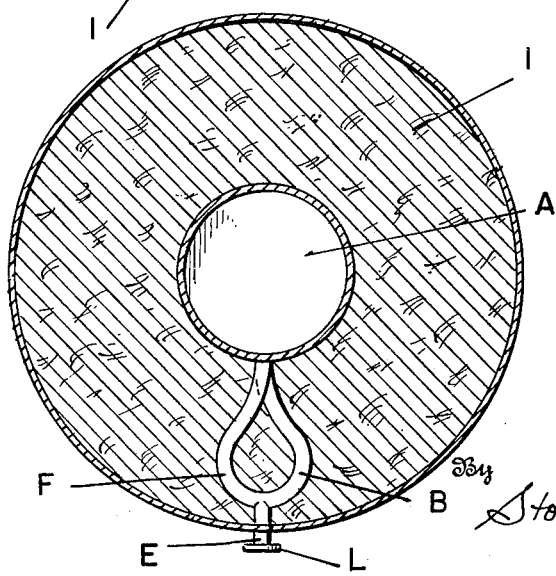

Three forms are shown in sectional elevation by Figs. 1, 2 and 5 respectively whereas a further form is shown by Fig. 3 in plan view and by Fig. 6 in perspective view.

In Figure 1, A is the receptacle containing the liquid the level of which is to be measured. Towards its lower portion is connected the outgoing branch or pipe B which brings the liquid to be vaporized to the ascending branch C where partial vaporization is produced by heating by contact with a metal plate D, itself heated either by the surrounding air in the case of a liquid boiling at a low temperature, or by any artificial heating means. This branch C is continued by an ascending branch E the end of which is connected by means of an attachment L, a pipe M and a further attachment O to one of the branches of a pressure gauge H, formed by a U tube filled with liquid. Towards the end of the vaporization zone in C is connected the additional branch F, returning to the receptacle A the vaporized gases which carry along the excess liquid. The gaseous atmosphere in said receptacle is in communication through the connection pipe G, an attachment K, a pipe N and a further attachment P with the other branch of the U tube constituting the pressure gauge. The difference of levels of the liquid in the U tube indicates the height of the liquid no longer, as in the known level indicators, above the level where the outgoing branch B is connected, but above the level where the additional branch F is connected to the receptacle A. At its other end, this additional branch F is preferably connected just above the portion of the vaporization branch C where partial vaporization ceases. Of course, the branch E could be connected to a part of the branch F. It is preferable that the difference of level between the connection points of the branches B and F be as small as practical because the apparatus gives no indications for the liquid levels lying below the place of connection of F.

Of course, as is known, with liquids having a very low boiling point with respect to the surrounding temperature, the heating plate D can be eliminated, the supply of heat to the liquid being then effected by heat drawn in from outside through the insulating material surrounding the branch of the device containing the liquid; in this case, the invention enables the outer surface of the branches B, C, F, through which this heat transfer is effected, to be reduced. Fig. 1 shows the insulating material I which may be substituted for the heating plate D. This material encloses in conventional manner the receptacle containing the liquefied gas and the piping leading therefrom to the pressure gauge. The heating of the liquid in branches B, C and F, and especially the vaporization branch C, which lies farthest from the receptacle A, is accomplished by leakage of heat from the surrounding atmosphere through the insulating material.

It has further been found, that in the level indicators according to this invention, the speed of circulation of the liquid which must be realized in the outgoing branch (B in Figure 1) must increase as the amount of impurities in the liquid increases, when dealing with one and the same kind of impurity.

In order to obtain this result under the best conditions, in the succession of tubes through which the liquid passes on its way from the receptacle and back again into it, at least that portion of this succession of tubes which is situated before the branch (E in Fig. 1) leading to the pressure gauge, and preferably also the remaining portion of said succession of tubes are given a form which facilitates the circulation of the liquid and which therefore does not comprise any descending portion, nor any abrupt change of direction. In this improved construction, the mean axis of the tubes through which the liquid passes on its way from the receptacle A and again back into it, may form a convex figure contained in a vertical plane. Fig. 2 shows such a device, in which the convex figure has the shape of a hair pin, having its axis of symmetry horizontal. In the figure, a portion of the device has been cut away between two horizontal planes so as to reduce the height of the figure. As in the device shown in Fig. 1, the vaporization of liquid chiefly takes place in branch C, which lies farthest from the receptacle, by leakage of heat through the insulating material I.

Figure 4:
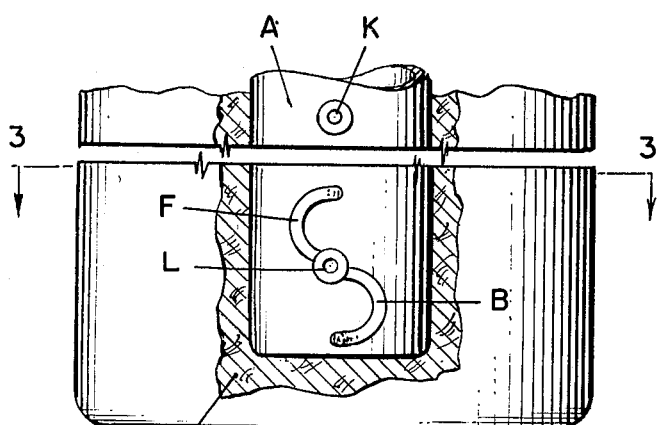

This form can still be improved upon by twisting the hair pin, the extremities of which have been previously fixed, about its horizontal axis so that its elbow shall perform a rotation of about 60° to 80°, thus forming with the horizontal an angle of about 30° to 10°; in this manner the rise of the fluid inside the hair pin is effected substantially along a constant slope, thus enabling a greater flow speed to be obtained and, consequently, for a same impure liquid, enabling the distance between the connections of the branches B and F with the receptacle containing the liquid to be decreased. Such a device is illustrated in Figs. 3, 4, and 6. In Figs. 4 and 6 the insulating material I has been torn away so as to show the arrangement of the several parts, and a portion of the height of the receptacle lying between two horizontal planes has been removed so as to reduce the height of the figures.

In this arrangement the flow of heat from the outside to the succession of pipes B, C and F in which flows the liquid takes place through the heat insulating material in the same manner as has been indicated above with respect to the procedure illustrated by Fig. 2.

Another advantageous form of embodiment can be realized in the manner shown in Fig. 5.

In this figure, the outgoing branch B and the additional branch F have a length reduced to a minimum and are formed substantially by the connections per se with the liquid receptacle; these connections are joined together by the substantially vertical, straight branch C. In the aforesaid case where the heat is solely supplied by a transfer from outside, the small surface of the connection B and of C no longer enables the necessary amount of heat to be supplied only by leakage of heat through the insulating material and, in this case, said heat is furnished almost solely by the branch E, which is made of a heat-conducting material, for instance a metal, and has a sufficiently large section so as to conduct a sufficiently large amount of heat from the surrounding medium. A larger section is preferably given to the connection B and to the greater part of the branch C than to the upper portion of C and to the connection F, these two portions merging through a conical portion. Under these conditions, the heat supply from E produces in the upper portion of C and in the connection F, a circulation of the mixture of gas and liquid, and these two portions of the level indicator are given a sufficiently reduced section to enable the gas bubbles to form with the liquid a row of beads or at least to ensure that the proportion of gas bubbles in the liquid is large enough to allow the gas-liquid mixture to rise in these two portions of the level indicator in a manner similar to what takes place in the device known under the name of "Mammoth" pump.

In the lower portion of the level indicator, only liquid circulates and its speed is relatively small, as is also therefore the loss of head. The intensity of circulation is determined by the heat supplied by the branch E and it is thus possible to effect an active circulation of liquid in the level indicator so as to avoid the accumulation of all undesired impurities.

I claim:

1. A liquid level indicator for a receptacle holding a low boiling liquid containing impurities boiling at higher temperatures, comprising means for indicating a pressure difference; an outgoing branch pipe through which low-boiling liquid is withdrawn from the receptacle, an ascending vaporization pipe communicating with said outgoing branch pipe outside said receptacle and in which said liquid circulates freely when heated, said vaporization pipe communicating with said pressure indicating means, and a return branch pipe communicating with said vaporization pipe and communicating with said receptacle in which return pipe the resulting mixture unrestrainedly flows back into said receptacle at a point above the level of the withdrawal point; means connecting the higher pressure connection of said indicating means with a part of the gas issuing from said resulting mixture and means connecting the lower pressure connection of said indicating means with the gas space in the receptacle; the place where the higher pressure is obtaining on said heated tube lying downstream the main place of heating of the liquid with respect to the direction of flow of the liquid outside the receptacle.

2. A liquid level indicator for a receptacle holding a low boiling liquid containing impurities boiling at higher temperatures, comprising means for indicating a pressure difference; an outgoing branch pipe through which low-boiling liquid is withdrawn from the receptacle, an ascending vaporization pipe communicating with said outgoing branch pipe outside said receptacle and in which said liquid circulates freely when heated, said vaporization pipe communicating with said pressure indicatng means, and a return branch pipe communicating with said vaporization pipe and communicating with said receptacle in which return pipe the resulting mixture unrestrainedly flows back into said receptacle at a point above the level of the withdrawal point; means connecting the higher pressure connection of said indicating means with a part of the gas issuing from said resulting mixture and means connecting the lower pressure connection of said indicating means with the gas space in the receptacle; the heating being performed by conveying heat to the place where the higher pressure is obtaining along the conduit which connects said place with the higher pressure connection of said indicating means.

3. A liquid level indicator for a receptacle holding a low boiling liquid containing impurities boiling at higher temperatures, comprising means for indicating a pressure difference; an outgoing branch pipe through which low-boiling liquid is withdrawn from the receptacle, an ascending vaporization pipe communicating with said outgoing branch pipe outside said receptacle and in which said liquid circulates freely when heated, said vaporization pipe communicating with said pressure indicating means, and a return branch pipe communicating with said vaporization pipe and communicating with said receptacle in which return pipe the resulting mixture unrestrainedly flows back into said rerectacle at a point above the level of the withdrawal point; the path followed by the gas liquid mixture outside the receptacle consisting of two conduits being with a substantially constant slope connected by a knee; means connecting the higher pressure connection of said indicating means with a part of the gas issuing from said resulting mixture and means connecting the lower pressure connection of said indicating means with the gas space in the receptacle.

4. A liquid level indicator for a receptacle holding a low boiling liquid containing impurities boiling at higher temperatures, comprising means for indicating a pressure difference; an outgoing branch pipe through which low-boiling liquid is withdrawn from the receptacle, an ascending vaporization pipe communicating with said outgoing branch pipe outside said receptacle and in which said liquid circulates freely when heated, said vaporization pipe communicating with said pressure indicating means, and a return branch pipe communicating with said vaporization pipe and communicating with said receptacle in which return pipe the resulting mixture unrestrainedly flows back into said receptacle at a point above the level of the withdrawal point; the shape of the path followed by the gas liquid mixture outside the receptacle being derived from a hair pin disposed in a vertical plane and the axis of symmetry of which is horizontal, by twisting the hair pin, the extremities of which have been previously fixed, about said axis, so as to obtain a conduit having throughout a substantially constant slope; means connecting the higher pressure connection of said indicating means with a part of the gas issuing from said resulting mixture and means connecting the lower pressure connection of said indicating means with the gas space in the receptacle.

5. A liquid level indicator for a receptacle holding a low boiling liquid containing impurities boiling at higher temperatures, comprising means for indicating a pressure difference; an outgoing branch pipe through which low-boiling liquid is withdrawn from the receptacle, an ascending vaporization pipe communicating with said outgoing branch pipe outside said receptacle and in which said liquid circulates freely when heated, said vaporization pipe communicating with said pressure indicating means, and a return branch pipe communicating with said vaporization pipe and communicating with said receptacle in which return pipe the resulting mixture unrestrainedly flows back into said receptacle at a point above the level of the withdrawal point; the path followed by the gas liquid mixture outside the receptacle consisting of two straight and substantially vertical conduits merging through a conical element of tube, the upper conduit being narrower than the lower conduit; means connecting the higher pressure connection of said indicating means with a part of the gas issuing from said resulting mixture and means connecting the lower pressure connection of said indicating means with the gas space in the receptacle.

JULES VOLEAU.

REFERENCES CITED

The following references are of record in the file of this patent:

UNITED STATES PATENTS

| Number | Name | Date |
|---|---|---|
| 1,696,810 | Mond | Dec. 25, 1928 |
| 1,886,179 | Goodloe | Nov. 1, 1932 |
| 1,902,276 | Bull | Mar. 21, 1933 |
| 1,904,785 | Gay | Apr. 18, 1933 |
| 2,032,681 | Zenner | Mar. 3, 1936 |
| 2,166,904 | Gray | July 18, 1939 |
| 2,326,511 | Zenner | Aug. 10, 1943 |
| 2,361,440 | Williamson | Oct. 31, 1944 |

Certificate of Correction

Patent No. 2,542,168                                                  February 20, 1951

JULES VOLEAU

It is hereby certified that error appears in the printed specification of the above numbered patent requiring correction as follows:

Column 1, line 31, for "deposited" read *deposited*; column 3, line 5, after the word "liquids" insert the commas and words , *such as liquid oxygen,*;

and that the said Letters Patent should be read as corrected above, so that the same may conform to the record of the case in the Patent Office.

Signed and sealed this 17th day of July, A. D. 1951.

[SEAL]

ERNEST F. KLINGE,
*Assistant Commissioner of Patents.*